(12) United States Patent
Voelz et al.

(10) Patent No.: US 9,014,917 B2
(45) Date of Patent: Apr. 21, 2015

(54) METHOD AND DEVICE FOR ADJUSTING AN INTERVENTION TORQUE OF A STEERING ASSISTANCE SYSTEM

(75) Inventors: Henning Voelz, Stuttgart (DE); Tobias Rentschler, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 13/879,308

(22) PCT Filed: Oct. 6, 2011

(86) PCT No.: PCT/EP2011/066488
§ 371 (c)(1),
(2), (4) Date: Sep. 27, 2013

(87) PCT Pub. No.: WO2012/059274
PCT Pub. Date: May 10, 2012

(65) Prior Publication Data
US 2014/0032047 A1    Jan. 30, 2014

(30) Foreign Application Priority Data
Oct. 14, 2010  (DE) .......................... 10 2010 042 440

(51) Int. Cl.
*B62D 5/04* (2006.01)
*B62D 15/02* (2006.01)
*G06K 9/00* (2006.01)
*B60W 30/18* (2012.01)

(52) U.S. Cl.
CPC ........ *B62D 5/0463* (2013.01); *B60W 30/18163* (2013.01); *B60W 2420/42* (2013.01); *B60W 2710/202* (2013.01); *B62D 15/0255* (2013.01); *G06K 9/00798* (2013.01)

(58) Field of Classification Search
CPC .................. B60W 30/18163; B60W 2420/42; B60W 2710/202; B62D 15/0255; B62D 5/0463; G06K 9/00796
USPC ............................................................ 701/41
See application file for complete search history.

(56) References Cited

U.S. PATENT DOCUMENTS

| | | |
|---|---|---|
| 2004/0143381 A1 | 7/2004 | Regensburger et al. |
| 2005/0004731 A1 | 1/2005 | Bohm et al. |
| 2009/0143967 A1* | 6/2009 | Lee et al. ...................... 701/119 |
| 2012/0033074 A1 | 2/2012 | Spangenberg |
| 2013/0187772 A1* | 7/2013 | Akiyama ...................... 340/436 |

FOREIGN PATENT DOCUMENTS

| | | |
|---|---|---|
| DE | 101 37 292 | 3/2003 |
| DE | 10 2009 023 444 | 1/2010 |

(Continued)

OTHER PUBLICATIONS

Machine Translation of JP 2006-113918 published Apr. 27, 2006.*

(Continued)

*Primary Examiner* — Mary Cheung
*Assistant Examiner* — Anne Mazzara
(74) *Attorney, Agent, or Firm* — Kenyon & Kenyon LLP

(57) ABSTRACT

A method for adjusting an intervention torque of a steering assistance system on a steering system of a vehicle in the context of a required lane change, the method encompassing a step of adapting a magnitude of the intervention torque in response to a detected marking that announces a lane merge in advance of a beginning of said merge.

10 Claims, 3 Drawing Sheets

(56) References Cited

FOREIGN PATENT DOCUMENTS

| | | |
|---|---|---|
| DE | 10 2009 007 342 | 8/2010 |
| EP | 1 653 310 | 5/2006 |
| EP | 1 808 350 | 7/2007 |
| JP | 2006/113918 | 4/2006 |

OTHER PUBLICATIONS

International Search Report, PCT International Application No. PCT/EP2011/066488, dated Dec. 6, 2011.

* cited by examiner

METHOD AND DEVICE FOR ADJUSTING AN INTERVENTION TORQUE OF A STEERING ASSISTANCE SYSTEM

FIELD

The present invention relates to a method and an apparatus for adjusting an intervention torque of a steering assistance system, in particular in the context of a required lane change of a vehicle.

BACKGROUND INFORMATION

Lane departure warning (LDW) systems, in which the driver of a motor vehicle is acoustically or haptically warned against departing from the driving lane, are commercially available. Also in series production, in addition to these LDW systems, are steering assistance systems or lane keeping support (LKS) systems, in which the driver is actively assisted, by directed guidance torques, in keeping the vehicle in the lane. The latest generation of line detection systems operates with a look-ahead range of up to 80 m. Yellow and white lines are detected.

German Patent Application No. DE 101 37 292 A1 describes a driver assistance system of a vehicle, in which a steering system of the vehicle is influenced in order to keep the vehicle within the course of a roadway.

SUMMARY

In accordance with the present invention, an example method and an example apparatus, and a corresponding computer product are provided for adjusting an intervention torque of a steering assistance system. Advantageous embodiments are described below.

In the context of a roadway merge, at least two lanes of a multi-lane road are combined so that at least one of the lanes ends and the road thus continues with a smaller number of lanes. In accordance with the present invention, it is recognized that a roadway merge is characterized and announced at an early stage by at least one road marking. A roadway marking of this kind can be detected, and can be used to control a steering assistance system with which the driver of a vehicle is actively assisted, by way of directed guide torques or intervention torques, in keeping the vehicle in the lane. Based on the detected roadway marking, the intervention torques can thus be modified in such a way that the driver is made aware of the roadway merge, the vehicle is guided toward the lane that continues, or the driving task is transferred to the driver. This enables a predictive "rampdown," i.e., a strategy for transferring the driving task to the driver, in order to increase safety in a steering assistance system.

The present invention provides an example method for adjusting an intervention torque of a steering assistance system on a steering system of a vehicle in the context of a required lane change, the method includes adapting a magnitude of the intervention torque in response to a detected marking that announces a lane merge in advance of a beginning of said merge.

A "steering assistance system" can be understood as a device for assisting the driver of the vehicle, which device helps the driver perform a driving task safely and efficiently. The steering assistance system can passively or actively influence the steering system of the vehicle by way of the intervention torque. For example, the steering assistance system can counteract a steering input of the driver, by way of the intervention torque, if that input would bring about a deviation of the vehicle from a target trajectory. For example, the intervention torque can be made available by the steering assistance system in order to counteract the steering input of the driver. The steering assistance system can also, by way of the intervention torque, generate a steering pulse via the steering system to the steerable wheels of the vehicle in order to keep the vehicle on a target trajectory or return it to the target trajectory. A steering torque acting on the steering system can thus result from an addition of an intervention torque and a steering torque applied by the driver. A "lane change" can be understood as a departure from a current lane on a road currently being traveled on, toward an adjacent lane on the same road, and establishment on the adjacent lane. The result of a lane merge can be that the lane currently being traveled on is no longer travelable, or ends, in front of the vehicle. For example, an obstacle such as a construction site can block or narrow a lane. A lane merge generally means that a lane ends and is merged with an adjacent lane. If the vehicle is in the lane that does not continue, a lane change is then required. The beginning of the lane merge can be characterized by a beginning of a diminution of a width of the lane. After the beginning of the lane merge, the width of the lane can decrease further, and a center line with respect to an adjacent lane that continues can end. The beginning of the lane merge can be detected by evaluating a course of the lateral line demarcating the lane. The marking that indicates the lane merge in advance can be a roadway marking, for example a directional arrow, a road sign, or any other information source. The marking announces the necessity for a lane change because of the upcoming lane merge. The marking is disposed, with reference to the direction of travel, before the beginning of the lane merge, and is spaced at least several meters away from the beginning of the lane merge. The marking is, in particular, not part of a line implementing the lane merge. For example, the roadway marking can be disposed more than 50 m before the beginning of the lane merge, and thus also before an actual end of the lane. The magnitude of the intervention torque can define a force that counteracts a steering intervention of the driver. The intervention torque can be reduced by adapting the magnitude of the intervention torque. The magnitude can be reduced continuously or in steps by way of the adaptation. The adaptation can occur over a longer time period that is determined by an actual or assumed distance between the vehicle and the lane merge. The intervention torque can be lowered in direction-dependent fashion. For example, the intervention torque in the direction of the lane change can be diminished. Toward the opposite side the intervention torque can be maintained or even increased. The result is that a direction of a lane change is defined. Alternatively, the intervention torque toward the opposite side can also be diminished.

The method can include a step of evaluating an image acquired by a surroundings sensing device of the vehicle in order to detect the marking. The surroundings sensing device can be a camera, for example a monocular video camera. The marking can be detected in the image by suitable evaluation. The marking can have standardized dimensions or a standardized shape, thereby facilitating detection. The image itself can be delivered via a suitable interface to an apparatus implementing the method.

The marking can be, for example, a directional arrow. A classification of the directional arrow can accordingly be carried out in the evaluation step. If multiple successive markings are used to announce the lane merge, the adaptation step can then be adapted only in response to a predetermined number of detected markings, for example after detection of the second marking in succession. To detect a directional arrow, a search can be made for a characteristic angle between at least two detected grayscale value transitions in the image. The characteristic angle can be constituted by the tip of the arrow. The shaft of the arrow can also exhibit a characteristic angle. The angle at the tip, in particular, can point in a direction to be traveled, e.g., toward the adjacent lane, and thus announce an end of the lane ahead. The grayscale value transition can be brought about by a light-dark transition between a roadway marking, for example a white or yellow arrow, and the roadway surface. As a result of the classification, a detected roadway marking can be compared with stored typical roadway markings. A function can be allocated to each of the stored roadway markings. It is thus possible to ascertain, by way of the classification, that a detected marking indicates a lane change.

According to an example embodiment, the intervention torque can serve to guide the vehicle on a target trajectory in a current lane of the vehicle. In the adaptation step, a course of the target trajectory can be brought closer to an adjacent lane that is being merged with the current lane in the context of the lane merge. A "target trajectory" can be understood as a path ahead, ascertained by the steering assistance system, for the vehicle. The target trajectory can be located centeredly between a right and a left edge of the lane. The driver can be made aware of the upcoming lane change by way of a change in the target trajectory in the direction of the adjacent lane. The target trajectory can be modified in this context in such a way that the vehicle remains within the lane, i.e., within the roadway marking. The intervention torque can be varied in such a way that the driver is stimulated to follow the course of the target trajectory.

In addition, the magnitude of the intervention torque can be adapted as a function of a look-ahead range of a device for detecting the beginning of the lane merge. The detection device can be a surroundings sensing device, for example a camera. This can be the same device that is also used to detect the marking. The look-ahead range can be limited by parameters of the detection device, by weather influences, or by a course of the lane. A current value with reference to a look-ahead range can be made available to the method. In the case of a short look-ahead range, the magnitude of the intervention torque can already be more greatly reduced as a precaution, even though the beginning of the lane merge itself has not yet been detected. Otherwise, if the look-ahead range is long and a beginning of the lane merge has not yet been detected, the adaptation of the intervention torque can be postponed or can be carried out to a lesser extent.

For example, the magnitude of the intervention torque can be reduced by a predetermined value within a predetermined time period if the look-ahead range is shorter than a predetermined minimum range. In this manner, a convenient transition strategy can be ensured even when the actual beginning of the lane merge is detected on a relative short-term basis, for example because of reduced visibility.

The magnitude of the intervention torque can also be continuously adapted in accordance with a distance from the beginning of the lane merge. The intervention torque can thus be continuously decreased with decreasing distance from the beginning of the lane merge, or to another characteristic portion of the lane merge. For example, the magnitude of the intervention torque can be reduced in proportion to a distance from the beginning of the lane merge. This enables a continuous transfer of the lane change driving task to the driver. A maximum distance can be defined by way of the look-ahead range.

For example, in a detection step the beginning of the lane merge can be detected based on a narrowing of the current lane of the vehicle. For this, a comparison can be carried out between a lane width at the vehicle's location and at the end of the look-ahead range. The beginning of the lane merge can also be detected based on an end of a separating line between the current lane and the lane that continues.

According to a further embodiment of the present invention, the method can encompass a step of making available, in response to the detected marking, a datum regarding the required lane change. The datum can be outputted optically, acoustically, or haptically. The driver can be prompted by the datum to perform the lane change independently. If an active steering intervention by the driver in order to carry out the lane change is detected, the intervention torque can then be reduced within a short period.

The present invention furthermore provides an example apparatus for adjusting an intervention torque of a steering assistance system on a steering system of a vehicle in the context of a required lane change, having the following feature:

a device for adapting a magnitude of the intervention torque in response to a detected marking that announces a lane merge in advance of a beginning of said merge.

The example apparatus can be part of a steering assistance system. The present invention thus furthermore creates a steering assistance system having an apparatus according to the present invention for adjusting the intervention torque of the steering assistance system.

An "apparatus" can be understood in the present case as an electrical device that processes sensor signals and outputs control signals as a function thereof. The control device can have an interface that can be embodied on a hardware and/or software basis. In a hardware-based embodiment the interfaces can be, for example, part of a so-called "system ASIC" that contains a very wide variety of functions of the apparatus. It is also possible, however, for the interfaces to be separate integrated circuits, or to be made up at least in part of discrete components. In a software-based embodiment the interfaces can be software modules that are present, for example, on a microcontroller in addition to other software modules.

Also advantageous is a computer program product having program code that can be stored on a machine-readable medium such as a semiconductor storage device, a hard disk storage device, or an optical storage device, and is used to carry out the method according to one of the embodiments described above when the program is executed on a device corresponding to a computer.

The present invention is further explained below with reference to the figures.

DETAILED DESCRIPTION OF EXAMPLE EMBODIMENTS

Figure 1:
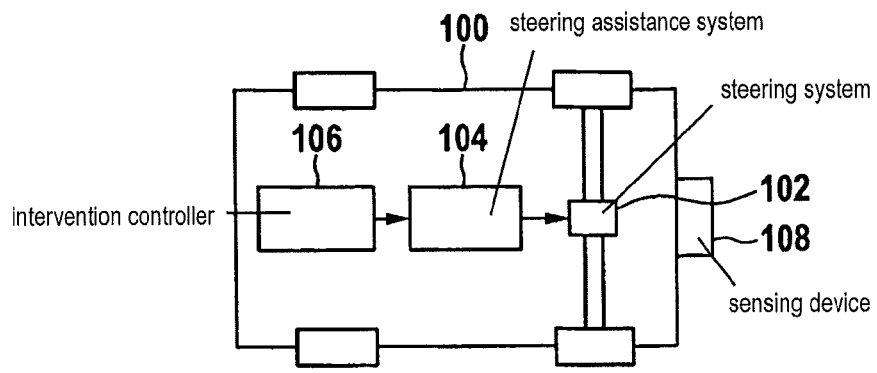
FIG. 1 schematically depicts a vehicle having a steering assistance system, according to an exemplifying embodiment of the present invention.

In the description that follows of preferred exemplifying embodiments of the present invention, identical or similar reference characters are used for the similarly functioning elements depicted in the various Figures, the description of these elements not being repeated.

FIG. 1 shows a vehicle 100 having a steering system 102 that acts on two wheels of vehicle 100. A steering assistance system 104 is embodied to impinge upon steering system 102 with an intervention torque. By way of one or more directed intervention torques, the driver of the vehicle can be actively assisted in keeping the vehicle in the lane. According to this exemplifying embodiment, a magnitude of the intervention torque is adapted when a marking that announces a lane merge ahead is detected. For this, apparatus 104 can make available to steering assistance system 104, via an interface, a corresponding control signal or an adjustment value for the intervention torque. The marking can be sensed and detected by a surroundings sensing device 108. A corresponding datum regarding the detected marking can be made available to apparatus 104 via an interface.

Figure 2:
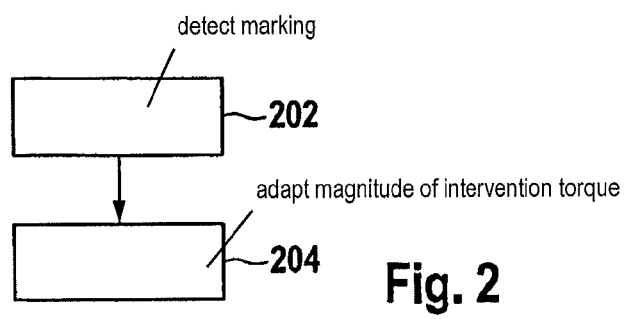
FIG. 2 is a flow chart of a method for adjusting an intervention torque of a steering assistance system, according to an exemplifying embodiment of the present invention.

FIG. 2 is a flow chart of an example method for adjusting an intervention torque of a steering assistance system, according to an exemplifying embodiment of the present invention. In a step 202 a marking is detected, said marking being disposed for example on the lane in order to announce a subsequent end of the lane because of a lane merge. A corresponding marking can be continuously searched for when the steering assistance system is activated. After detection of the marking, in a step 204 the magnitude of the intervention torque is adapted. Adaptation of the magnitude of the intervention torque can be carried out in accordance with adaptation stipulations such as those described with reference to the exemplifying embodiments that follow. The intervention torque can, for example, be reduced in steps in different ways depending on the look-ahead range of the assistance system.

Figure 3:
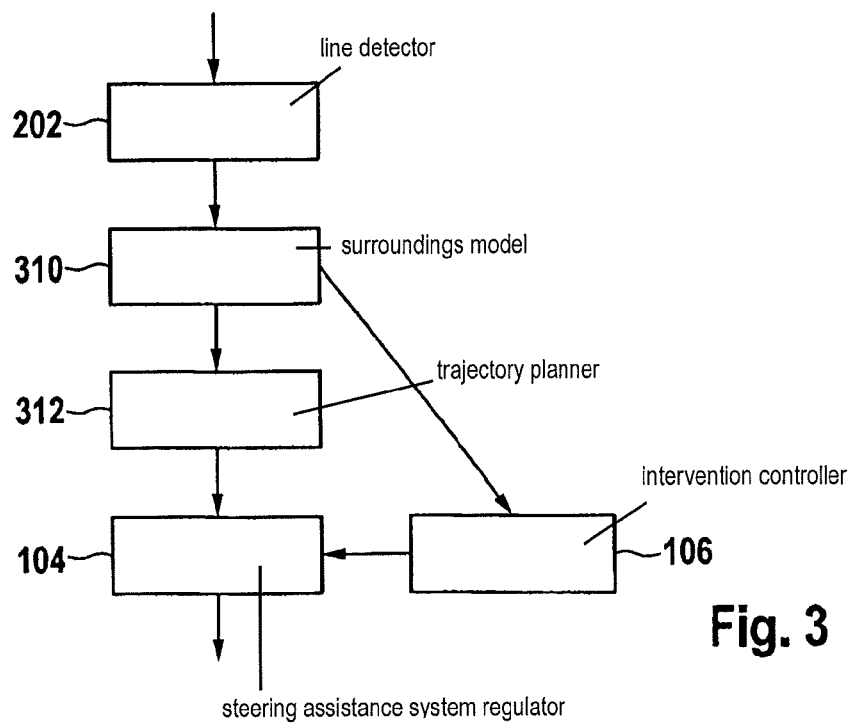
FIG. 3 shows a model structure of a system according to the present invention.

FIG. 3 shows a model structure of a system for adjusting an intervention torque of a steering assistance system, according to an exemplifying embodiment of the present invention. The system encompasses a line detector 202, a surroundings model 310, a trajectory planner 312, a steering assistance system regulator 104, and an intervention controller 106. Lines and markings on the lane located in front of the vehicle can be detected via line detector 202. The surroundings of the vehicle can be modeled using surroundings model 310, based on the lines detected by line detector 202. On that basis, using trajectory planner 312, a target trajectory that defines a further travel path of the vehicle can be determined. In accordance with the target trajectory, steering assistance system regulator 104 can define intervention torques that influence the steering system of the vehicle in such a way that the vehicle follows the target trajectory. In addition, the information obtained by way of surroundings model 310 can be used by intervention controller 106 to determine stipulations for steering assistance system regulator 104. For example, an intervention torque of steering assistance system regulator 104 can be modified by intervention controller 106 when surroundings model 310 indicates a lane merge.

Figure 4:
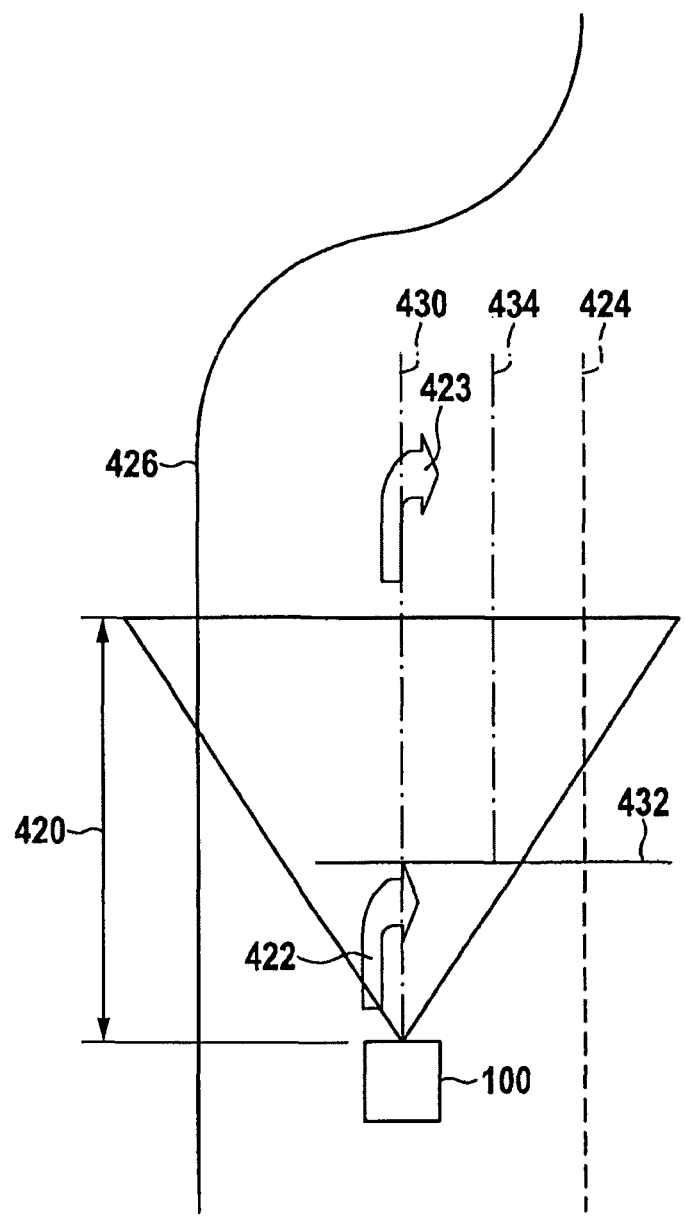
FIG. 4 depicts a lane merge situation, according to an exemplifying embodiment of the present invention.

FIG. 4 depicts a lane change situation for a vehicle 100 that is equipped with a driver assistance system, according to an exemplifying embodiment of the present invention. The driver assistance system has a sensing region having a sensing range or look-ahead range 420. The sensing range covers a portion of the lane located in front of vehicle 100. Look-ahead range 420 can be shorter than a distance between two roadway marking arrows 422, 423. Roadway marking arrows are disposed on a current lane that is demarcated by a right roadway marking 424 and a left roadway marking 426. Vehicle 100 is traveling in the current lane. The current lane is ending as a result of a lane merge. A beginning of the lane merge is characterized by a constriction of the current lane, which constriction is introduced by an inward turning of left roadway marking 426 toward right roadway marking 424. Left roadway marking 424 ends approximately at the location where the constriction begins. As a result of the lane merge, a lane change by vehicle 100 from the current lane to the adjacent right lane is required. Roadway marking arrows 422 point toward the adjacent right lane that continues. Vehicle 100 is guided by the driver assistance system on an original target trajectory 430. Original target trajectory 430 extends approximately along the center of the current lane. As a result of the lane merge, original target trajectory 430 and the associated intervention torque cannot be maintained. An adaptation is required; in accordance with this exemplifying embodiment it is executed when vehicle 100 reaches line 432 that characterizes an adaptation start. The adaptation start is triggered by a detection of roadway marking arrow 422. Roadway marking arrow 422 can already be the second directional arrow that indicates the lane merge. For adaptation, an adapted target trajectory is determined which extends toward right roadway marking 424, offset from original target trajectory 310, within the current lane. As a result of an adaptation of the intervention torque on the steering system of vehicle 100, vehicle 100 can turn in toward adapted target trajectory 434.

According to this exemplifying embodiment, the directional arrows marked on the roadway are detected and their direction is classified. This information is used in the surroundings model of an LKS system for predictive initiation of a specific transition strategy (rampdown) for the end of the lane.

According to an exemplifying embodiment, detection and classification of the roadway directional arrows can be carried out using only a monocular video camera. The configuration of the specific rampdown function according to the present invention results in a high level of driver acceptance. This function is embedded in the overall system. It is thereby possible to avoid having the lane merge be detected very late, thus enabling a conveniently timed transfer strategy to the driver.

An LKS system according to an exemplifying embodiment of the present invention offers increased safety when driving on expressways and main roads. The LKS system as shown, for example, in FIG. 3 exhibits a high level of automation. A video camera, on whose images the LKS system is based, works with a typical look-ahead range of up to 80 m. Multiple directional arrows are provided in the region of the lane merge, at spacings which are larger than the camera look-ahead range. Thanks to detection and classification of the directional arrows, a rampdown in the form according to the present invention can already be initiated well before the end of the merge. Detection and classification of the directional arrows can be carried out in the "line detection" module. Detection and classification of the directional arrows is described with reference to FIGS. 5 and 6.

In the trajectory planning operation shown in FIG. 3, the target position of the system is adapted after a directional arrow has been detected twice. Adaptation occurs by modifying the lateral target box by a defined value $Y_{adapt}$ that can be in the value range from 10 to 40 cm. Because a roadway merge necessitates a lane change by the driver to the adjacent lane, the target box is adapted in precisely that direction in order to sensitize the driver. The result of this is that the vehicle moves toward the lane that is to be changed into, and the driver is thus gently informed as to the lane change that is to be performed, as shown in FIG. 4.

The target trajectory is defined in the present invention as $$Y(S)_{target} = Y_{center} + Y_{adapt} + x*\phi_{Dtarget} + 0.5x^2*\kappa_{target} + 0.125*x^3*\kappa'_{target}$$

At the same time, a predictive rampdown is carried out by the LKS system in the intervention controller shown in FIG. 3.

In contrast to a rampdown that carries out a gradual decrease in the intervention torque to zero within a period from 0 to 2 seconds, the predictive rampdown is carried out here in several stages.

In a stage 1, after detection of a second directional arrow, an optical indication is presented to the driver, e.g., in the form of a flashing directional arrow, for example in a combination instrument or a head-up display, or also in the form of other symbols, e.g., a flashing line. The driver is thereby prompted to take over the driving task.

A stage 2 is initiated when the end of the lane marking is detected. This is achieved on the basis of a comparison of the left and the right marking. The lane width at maximum look-ahead is calculated. The width directly in front of the vehicle is likewise calculated. If a decrease in width at the look-ahead point is evident, the look-ahead range is stored as the maximum range and is used as a standardization value $I_{standard}$. The intervention torque is then lowered as a function of the changing look-ahead range, namely the still-straight marked line labeled 424 in FIG. 4.

The formula is:

$$M_{rampdown} = (l_v / l_{standard}) * M_{intervention}$$

where $L_v$ is the look-ahead range of line 424 in FIG. 4, $M_{intervention}$ the intervention torque without a lane merge, and $M_{rampdown}$ the intervention torque applied at the steering wheel.

This variant of stage 2 is used only when a look-ahead range of, for example, >60 m exists as stage 1 begins. Alternatively, a phase A of the rampdown is immediately initiated, in which the intervention torque is immediately lowered to half the current value. This occurs within a predefined period of, for example, 2 seconds. The halved intervention torque is applied by the system until the end of the marking is detected (stage 2). When the end of the marking is detected as described in stage 2, the further rampdown as described in stage 2 is then carried out in look-ahead-dependent fashion in a phase B.

When the driver takes over management of the vehicle by steering, e.g., by initiating a lane change, the intervention torque is then lowered to zero within a defined time. The takeover of vehicle management by the driver can be detected on the basis of predefined criteria.

The approach according to the present invention can represent an important building block for safe LKS operation on expressways. Utilization in a context of line detection and lane keeping support is therefore sensible.

Figure 5:
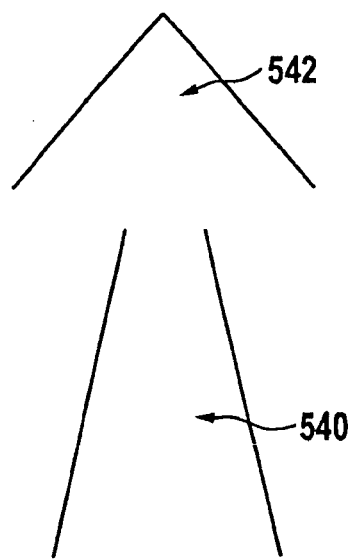
FIG. 5 depicts detected grayscale value transitions of a directional arrow.

FIG. 5 is a depiction of detected grayscale value transitions of a directional arrow having a stem 540 and an arrowhead that exhibits a characteristic angle 542. The directional arrow represents a straight-ahead arrow. The lines defined by the grayscale value transitions can be detected and evaluated. The direction in which the directional arrow is pointing can be detected by way of the characteristic angle 542 and its orientation with reference to stem 540.

Figure 6A:
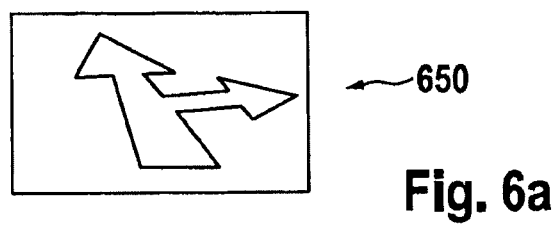
FIGS. 6a to 6c are illustrations of directional arrows.
Figure 6B:
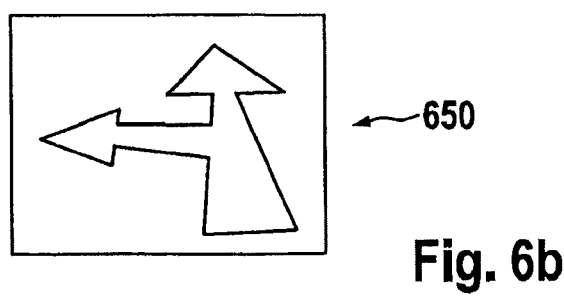
Figure 6C:
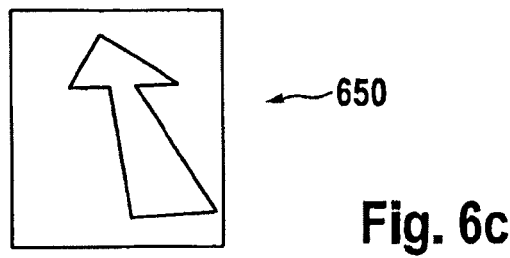

FIGS. 6a to 6c represent images 650 of directional arrows that may have been acquired, for example, by a video camera and that can be evaluated in order to detect a roadway marking which indicates a lane merge. Transitions between light and dark in images 650 form lines, as shown in FIG. 5. The arrow shown in FIG. 6a indicates a straight-ahead and right-turn lane, the arrow shown in FIG. 6b indicates a straight-ahead and left-turn lane, and the arrow shown in FIG. 6c indicates a straight-head lane.

Detection and classification of the directional arrows is carried out in the image based on characteristic shape, color, and location. Only directional arrows that are located in front of the vehicle are relevant to the system. These are typically light (line color) against a dark background (road asphalt). An arrow can be detected and classified based on the disposition of the detected grayscale value transitions (gradients), which can be calculated, e.g., using a Sobel filter.

FIGS. 6a to 6c show a variety of arrows. At their edges, the arrows exhibit gradients with respect to the roadway surface. The arrows are looked for in the center of the lower half of the image. One criterion here is the angle of the detected gradients at the tip of the arrow and the decreasing-width "stem" of the arrow.

The classification of the arrow, e.g., left, right, or straight ahead, can be determined based on the orientation of the angle. The shape of the arrow is typically standardized in each country, so that all arrows in Germany look the same; in other countries there may be other shapes, which can then be detected on the basis of another angle-stem criterion. Country-based information from additional data sources, such as, e.g., a navigation system, can be used to minimize incorrect classifications.

Classification of the arrow based on the aforesaid features has the advantage, as compared with other methods from image processing (such as template matching), that even arrows with less-than-ideal markings or slight deviations from the standard can be detected and classified, for example when arrows in Austria are only slightly different from those in Germany.

A determination of the three-dimensional position of the arrow is not necessary for the method according to the present invention, since only the point in time of occurrence is relevant.

The lane detected in the system can also be used to plausibilize the position. Relevant arrows are always located between the left and right lane markings. The classified directional arrows are forwarded to the surroundings model shown in FIG. 3. From there they are passed on to the intervention controller which generates a rampdown behavior, and to the trajectory planner which generates a target trajectory.

The exemplifying embodiments described and shown in the Figures are selected only as by way of example. Different exemplifying embodiments can be combined with one another in their entirety or only with regard to individual features. An exemplifying embodiment can also be supplemented with features of a further exemplifying embodiment. In addition, method steps according to the present invention can be repeated and can be executed in a sequence different from that described.

What is claimed is:

1. A method for adjusting an intervention torque of a steering assistance system on a steering system of a vehicle on a roadway in the context of a required lane change, the method comprising:
   adjusting the intervention torque in response to a detected marking on the roadway that announces a lane merge in advance of a beginning of the merge.

2. The method as recited in claim 1, further comprising:
   evaluating an image from a surroundings sensing device of the vehicle to detect the marking.

3. The method as recited in claim 2, wherein the marking is a directional arrow, and wherein the evaluating includes classifying the directional arrow.

4. The method as recited in claim 1, wherein the intervention torque serves to guide the vehicle on a target trajectory in a current lane of the vehicle, and wherein, in the adjusting step, a course of the target trajectory is brought closer to an adjacent lane that is being merged with the current lane in the context of the lane merge.

5. The method as recited in claim 1, wherein the adjusting step includes adjusting the intervention torque as a function of a look-ahead range of a device for detecting a beginning of the lane merge.

6. The method as recited in claim 5, wherein the adjusting step includes reducing the magnitude of the intervention torque by a predetermined value within a predetermined time period if the look-ahead range is shorter than a predetermined minimum range.

7. The method as recited in claim 5, wherein the adjusting step includes continuously adjusting the intervention torque with a distance from the beginning of the lane merge.

8. The method as recited in claim 1, further comprising:
   detecting the beginning of the merge based on a narrowing of a current lane of the vehicle.

9. An apparatus for adjusting an intervention torque of a steering assistance system on a steering system of a vehicle on a roadway in the context of a required lane change, comprising:
   a device to adjust the intervention torque in response to a detected marking on the roadway that announces a lane merge in advance of a beginning of the merge.

10. A non-transitory computer readable storage medium storing program code for adjusting an intervention torque of a steering assistance system on a steering system of a vehicle on a roadway in the context of a required lane change, the program code, when executed by a control unit, causing the control unit to perform:
   adjusting the intervention torque in response to a detected marking on the roadway that announces a lane merge in advance of a beginning of the merge.

* * * * *